(12) United States Patent
Gross et al.

(10) Patent No.: US 8,343,570 B2
(45) Date of Patent: Jan. 1, 2013

(54) STABILIZERS FOR THERMOSETTING POWDER COATING COMPOSITIONS

(75) Inventors: Thomas Gross, Stühlingen (DE); Conny Te Walvaart, De Bunde (NL); Hub Bernsen, Urmond (NL); Jules Lahaye, Lanaken (BE)

(73) Assignee: DCC IP, Erin Court, Bishop's Court Hill, St. Michael (BB)

( * ) Notice: Subject to any disclaimer, the term of this patent is extended or adjusted under 35 U.S.C. 154(b) by 1132 days.

(21) Appl. No.: 12/084,748

(22) PCT Filed: Nov. 8, 2006

(86) PCT No.: PCT/EP2006/068199
§ 371 (c)(1),
(2), (4) Date: May 8, 2008

(87) PCT Pub. No.: WO2007/057327
PCT Pub. Date: May 24, 2007

(65) Prior Publication Data
US 2009/0232968 A1    Sep. 17, 2009

(30) Foreign Application Priority Data
Nov. 17, 2005    (EP) ..................................... 05110839

(51) Int. Cl.
*B05D 1/04*      (2006.01)
*B05D 1/24*      (2006.01)
*C09D 1/00*      (2006.01)
*C08K 5/49*      (2006.01)
*C08K 5/53*      (2006.01)
*C08K 5/524*     (2006.01)

(52) U.S. Cl. ........ 427/11; 427/185; 427/485; 106/31.01; 106/31.97; 524/108; 524/115; 524/132; 524/135

(58) Field of Classification Search ........................ None
See application file for complete search history.

(56) References Cited

U.S. PATENT DOCUMENTS

| 5,347,014 A | 9/1994 | Bäbbler | |
| 2003/0170400 A1 | 9/2003 | Laver et al. | 427/458 |
| 2004/0067311 A1 | 4/2004 | Baudin et al. | 427/301 |
| 2004/0077742 A1 | 4/2004 | Hilger et al. | 522/1 |

FOREIGN PATENT DOCUMENTS

| CA | 2208651 | 12/1997 |
| EP | 0604370 A1 | 6/1994 |
| EP | 1443086 A1 | 8/2004 |
| JP | 07-002858 | 8/1995 |
| JP | 10-060313 | 3/1998 |

OTHER PUBLICATIONS

Japanese Patent Office, Office Action in Japanese Appln. No. 2008-540577 (Feb. 8, 2012).

*Primary Examiner* — John J Figueroa
(74) *Attorney, Agent, or Firm* — Leydig, Voit & Mayer, Ltd.

(57) ABSTRACT

The present invention relates to thermosetting powder coating compositions comprising of at least one bismuth-containing inorganic pigment, at least one organic phosphorous stabilizer, at least one thermally polymerizable thermosetting powder coating resin and at least one crosslinker. The inventive thermosetting powder coating compositions are advantageously used where there is a need for heat resistant coatings and where only minor surface modifications during over bake conditions are acceptable. The invention also relates to the use of the inventive thermosetting powder coating compositions for the preparation of powdered paints and varnishes for the making of coatings and to coatings obtained therewith.

18 Claims, No Drawings

STABILIZERS FOR THERMOSETTING POWDER COATING COMPOSITIONS

The present invention relates to thermosetting powder coating compositions comprising bismuth-containing inorganic pigments with improved heat stability. The invention also relates to the use of said compositions for the preparation of powdered paints and varnishes for the making of coatings and to coatings obtained therewith.

Thermosetting powder compositions are well known in the art and are widely used as paints and varnishes for coating the most various articles. The advantages of these powder coatings are numerous; on the one hand, the problems associated with solvents are completely eliminated, and on the other hand, the powders can be used without any loss since only the powder in direct contact with the substrate is retained on the article, the excess of powder being, in principle, entirely recoverable and reusable. For these and other reasons, the powder coating compositions are preferred to coating compositions in the form of solutions in organic solvents.

Thermosetting powder compositions have already been widely used in the coating of domestic electrical appliances, automobile industry accessories, and the like. They generally contain a thermosetting organic binder, fillers, pigments, catalysts and various additives used to adapt their properties to their intended use.

Powder coating is described, for example, in "Ullmann's Encyclopedia of Industrial Chemistry, Fifth, Completely Revised Edition, Volume A 18", pages 438 to 444 (1991). In the powder coating process, a powder is generally fluidized with supply of air, electrostatically charged and applied to an earthed, preferably metallic substrate. The substrate is subsequently heated, in the course of which the adhering powder melts, coalesces and forms a coherent film on the metal surface. Since powder coating requires no solvent, this technology is especially friendly to the environment.

Thermosetting powder coating compositions comprising bismuth-containing inorganic pigments are known for their unsatisfying heat stability. For example, carboxylated polyester resins crosslinked with polyfunctional epoxy crosslinkers or hydroxylalkylamides containing bismuth vanadate pigments exhibit poor heat stability during over bake cycles. The applied paint film gets damaged and the paint flows off the applied substrate.

This problem is triggered with the use of bismuth-containing inorganic pigments, in particular bismuth vanadate pigments are not acceptable in powder coating applications and for the paint manufacturer still is an unsolved problem. The lead free approach of the coatings industry, started over the last years, is causing an increasing demand for high saturated, high opaque and weather resistant yellow pigments like the bismuth vanadate chemistry for the orange and yellow shade area.

In the prior art, powder coating compositions are stabilized with a mixture of sterically hindered phenols, for example the octadecyl ester of 3-(3,5-di-tert-butyl-4-hydroxyphenyl)-propionic acid. With this stabilization, however, when the powder coating composition is cured at elevated temperatures, especially in a gas oven, a severe unwanted discolouration of the coating is observed. Another disadvantage inherent to the stabilization with sterically hindered phenol compounds is, that the stability of the coating to oxidative attack is greatly reduced.

Strategies for improving the heat stability of thermosetting powder coating compositions comprising bismuth-containing pigments are highly desired. The known stabilizers do not satisfy the stringent requirements in every respect, that a stabilizer or a mixture of stabilizers should meet, especially in terms of the discolouration of heat-curable powder coating compositions.

Surprisingly, it has now been found that organic phosphorous containing stabilizers provide an outstanding improvement on the heat stability of the coating when used in powder coating compositions comprising bismuth-containing pigments.

Above described failures of the coating film caused by an over bake cycle are reduced or totally gone. The curing temperature and or time can be significantly increased without resulting in a defect of the coating layer. Therefore the powder coating system is getting significantly less sensitive on thermal degradation during over bake conditions. Such over baking can be necessary, for example, if the conveyor belt in the heated oven remains at a standstill or if components require recoating because of coating film defects.

In a first aspect, the present invention relates to a colorant composition comprising of:
(i) at least one bismuth-containing inorganic pigment, and
(ii) at least one organic phosphorous containing stabilizer.

Preferably, the at least one bismuth-containing inorganic pigment is at least one bismuth vanadate pigment or $BiVO_4$-containing mixed phase pigment.

Bismuth vanadate compounds have been known for a long time, and the possibility of using them as pigments was recognised in the seventies, as emerges from G. Buxbaum, Industrial Inorganic pigments, VCH-Verlag (1993) and, inter alia, from U.S. Pat. Nos. 3,843,554 and 4,115,142. They are highly valued in particular because of their low toxicity and their good coloristic properties. In the course of the past few years, innummerable methods have been developed to further improve their properties, e.g. by partially replacing Bi and V with other metals or nonmetals, or by encapsulating them with inorganic or organic substances. Such methods are disclosed, inter alia, in U.S. Pat. No. 5,536,309, U.S. Pat. No. 4,115,142, U.S. Pat. No. 4,272,296, U.S. Pat. No. 4,316,746, U.S. Pat. No. 4,455,174, U.S. Pat. No. 5,203,917, U.S. Pat. No. 5,336,312, U.S. Pat. No. 5,399,197, U.S. Pat. No. 4,752,460 and EP 441 101.

Bismuth vanadate pigments within the meaning of the present invention include those of the general composition $[Bi_2O_3 \times V_2O_5]$, wherein bismuth and vanadium may be partially replaced with other metals or nonmetals. These bismuth vanadate pigments are known in the art. The metals and nonmetals which may partially replace bismuth and vanadium are preferably Li, Mg, Zn, Al and, in particular, Ca, and also W and, in particular, P and Mo. Said bismuth vanadate pigments are preferably commercially available bismuth vanadate pigments which are called C.I. Pigment Yellow 184 (see The Bulletin of the Bismuth Institute 68, 1995).

Preference is given to bismuth vanadate multi-phase pigments with additives such as silicates, phosphates or sulfates known in the art (DE 2 933 778, DE 2 940 185 and DE 3 004 083). Other suitable bismuth vanadate multi-phase pigments include bismuth vanadate/tungstate derivatives and bismuth vanadate/molybdate derivatives as described in the patent specification U.S. Pat. No. 4,455,174. These are multi-phase products consisting of a bismuth vanadate phase and also a bismuth molybdate and/or bismuth tungstate phase. Further suitable bismuth vanadate pigments are described in the U.S. Pat. No. 4,752,460, in which solid solutions of bismuth vanadate having particular amounts of molybdate and/or tungstate are disclosed.

Among the bismuth-containing inorganic pigments within the meaning of the present invention, bismuth oxide iodide as a red pigment and as described for instance in GB 444 740 is also preferred. Likewise, solid solutions consisting of bismuth oxide iodide, bismuth oxide chloride and bismuth oxide bromide [$BiOI_{1-x-y}Br_xCl_y$] as described in U.S. Pat. No. 4,252,570 are preferred. These bismuth oxide halide solid solutions crystallise in a form related to the tetragonal PbFCl structure. In terms of color, the solid solutions vary from yellow through red-orange to coral red when x decreases from 0.75 to 0 and, at the same time, the spacing of the layers in the crystal lattice increases. The color is substantially governed by x+y. The higher the iodide content, the more marked is the shift towards red. The light-fastness increases as the chloride content decreases. The tinctorial strength of bismuth oxide halide pigments is comparable to that of lead chromate, although the bismuth oxide halide pigments are inferior in terms of color purity.

Special preference is also given to $BiVO_4$-containing solid solutions as the inorganic bismuth-containing pigment within the meaning of the present invention. Without being limited thereto, preferred $BiVO_4$-containing solid solutions include $\{[BiVO_4]_x \cdot [CaMoO_4]_y\}$; $\{[BiVO_4]_x \cdot [Bi_2MoO_6]_y \cdot [Bi_2WO_6]_z\}$; $\{[BiVO_4]_x \cdot [Bi_2MoO_6]_y\}$ and $\{[BiVO_4]_x \cdot [Bi_2Wo_6]_y\}$.

The colorant composition of the present invention may comprise mixtures of one or more different bismuth-containing pigments, preferably pigments of the P.Y. 184 chemistry, or mixtures of one or more different bismuth-containing pigments, preferably pigments of the P.Y. 184 chemistry and inorganic pigments, or mixtures of one or more different bismuth-containing pigments, preferably pigments of the P.Y. 184 chemistry and organic pigments, or mixtures of one or more different bismuth-containing pigments, preferably pigments of the P.Y. 184 chemistry and inorganic and organic pigments.

Additional inorganic pigments within the meaning of the present invention include oxides and oxide hydroxides, preferably iron oxide pigments and chromium oxide pigments, oxidic mixed-phase pigments, cadmium, cerium sulfide, chromate, ultramarine and iron blue pigments. Special preference is given to lead chromate, cerium sulfide, rutile and spinel pigments. Mixtures of these inorganic pigments are also suitable.

Additional organic pigments within the meaning of the present invention include anthraquinone, anthrapyrimidine, azo, azomethine, quinacridone, quinophthalone, diketopyrrolopyrrole, indanthrone, isoindoline, isoindolinone, metal complex, perinone, perylene, phthalocyanine, pyranthrone, pyrazoloquinazolone and thioindigo pigments. Mixtures of these organic pigments are also suitable.

The inorganic bismuth-containing pigments can be present in the inventive colorant composition in combination with customary white, black or coloured pigments, especially with inorganic and organic pigments, for instance diketopyrrolopyrroles, quinacridones, dioxazines, perylenes or phthalocyanines, and also with effect pigments of similar or different colour.

In mixtures, the ratio of inorganic bismuth-containing pigment within the meaning to the invention to other pigments is advantageously from 1:1000 to 1000:1, preferably from 1:100 to 100:1 and more preferably from 1:10 to 10:1.

Preferably, the at least one organic phosphorous containing stabilizer is at least one organic phosphite or phosphonites selected from the group consisting of formulae (1), (2), (3), (4), (5), (6) and (7)

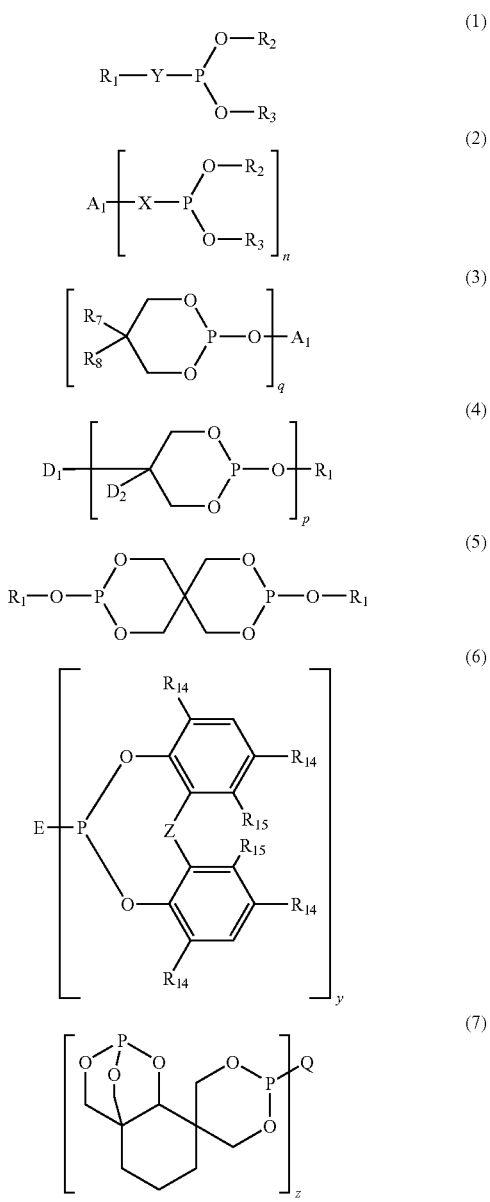

in which the indices are integral and
n is 2, 3 or 4; p is 1 or 2; q is 2 or 3; r is 4 to 12; y is 1, 2 or 3; and z is 1 to 6;

$A_1$, if n is 2, is $C_2$-$C_{18}$ alkylene; $C_2$-$C_{12}$ alkylene interrupted by oxygen, sulfur or —$NR_4$;-; a radical of the formula

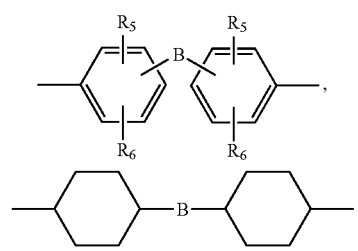

or phenylene;
$A_1$, if n is 3, is a radical of the formula $—C_rH_{2r-1}—$;
$A_1$, if n is 4, is

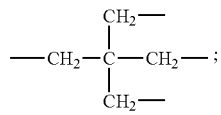

$A_2$ is as defined for $A_1$ if n is 2;
B is a direct bond, $—CH_2—$, $—CHR_4—$, $—CR_1R_4—$, sulfur, $C_5$-$C_7$ cycloalkylidene, or cyclohexylidene, which is substituted by from 1 to 4 $C_1$-$C_4$ alkyl radicals in position 3, 4 and/or 5;
$D_1$, if p is 1, is $C_1$-$C_4$alkyl and, if p is 2, is $—CH_2OCH_2—$;
$D_2$, if p is 1, is $C_1$-$C_4$ alkyl;
E, if y is 1, is $C_1$-$C_{18}$alkyl, $—OR_1$ or halogen;
E, if y is 2, is $—O-A_2-O—$,
E, if y is 3, is a radical of the formula $R_4C(CH_2O—)_3$ or $N(CH_2CH_2O—)_3$;
Q is the radical of an at least z-valent alcohol or phenol, this radical being attached via the oxygen atom to the phosphorus atom;
$R_1$, $R_2$ and $R_3$ independently of one another are $C_1$-$C_{18}$ alkyl which is unsubstituted or substi-tuted by halogen, $—COOR_4$, $—CN$ or $—CONR_4R_4$; $C_2$-$C_{18}$ alkyl interrupted by oxygen, sulfur or $—NR_4—$; $C_7$-$C_9$ phenylalkyl; $C_5$-$C_{12}$ cycloalkyl; phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula

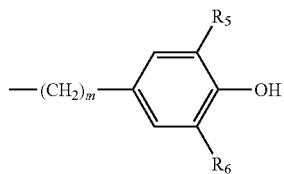

in which m is an integer from the range 3 to 6;
$R_4$ is hydrogen, $C_1$-$C_{18}$ alkyl, $C_5$-$C_{12}$ cycloalkyl or $C_7$-$C_9$ phenylalkyl,
$R_5$ and $R_6$ independently of one another are hydrogen, $C_1$-$C_8$ alkyl or $C_5$-$C_6$ cycloalkyl,
$R_7$ and $R_8$, if q is 2, independently of one another are $C_1$-$C_4$ alkyl or together are a 2,3-dehydropentamethylene radical; and
$R_7$ and $R_8$, if q is 3, are methyl;
$R_{14}$ is hydrogen, $C_1$-$C_8$ alkyl or cyclohexyl,
$R_{15}$ is hydrogen or methyl and, if two or more radicals $R_{14}$ and $R_{15}$ are present, these radicals are identical or different,
X and Y are each a direct bond or oxygen,
Z is a direct bond, methylene, $—C(R_{16})_2—$ or sulfur, and
$R_{16}$ is $C_1$-$C_8$ alkyl.
$C_2$-$C_{18}$ alkylene is a branched or unbranched radical, for example ethylene, propylene, trimethylene, tetramethylene, pentamethylene, hexamethylene, heptamethylene, octamethylene, decamethylene, dodecamethylene or octadecamethylene. Preference is given to $C_2$-$C_{12}$ alkylene, especially $C_2$-$C_8$ alkylene.
$C_2$-$C_{18}$ alkylene interrupted by oxygen, sulfur or $—NR_4—$ is, for example, $—CH_2—O—CH_2—$, $—CH_2—S—CH_2—$, $—CH_2—NH—CH_2—$, $—CH_2—N(CH_3)—CH_2—$, $—CH_2—O—CH_2CH_2—O—CH_2—$, $—CH_2—(O—CH_2CH_2—)_2O—CH_2—$, $—CH_2—(O—CH_2CH_2—)_3O—CH_2—$, $—CH_2—(O—CH_2CH_2—)_4O—CH_2—$ or $—CH_2CH_2—S—CH_2CH_2—$.

A $C_1$-$C_4$ alkyl-substituted $C_5$-$C_7$ cycloalkylidene ring, which preferably contains 1 to 3, especially 1 or 2 branched or unbranched alkyl group radicals, is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene or cycloheptylidene. Preference is given to cyclohexylidene and tert-butylcyclohexylidene.

Alkyl having up to 18 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl. Halogen (halo) is, for example, chlorine, bromine or iodine. Preference is given to chlorine. $C_2$-$C_{18}$ alkyl interrupted by oxygen, sulfur or $—NR_4—$ is, for example, $CH_3—O—CH_2—$, $CH_3—S—CH_2—$, $CH_3—NH—CH_2—$, $CH_3—N(CH_3)—CH_2—$, $CH_3—O—CH_2CH_2—O—CH_2—$, $CH_3—(O—CH_2CH_2—)_2O—CH_2—$, $CH_3—(O—CH_2CH_2—)_3O—CH_2—$ or $CH_3—(O—CH_2CH_2—)_4O—CH_2—$.

$C_7$-$C_9$ phenylalkyl is, for example, benzyl, α-methylbenzyl, α,α-dimethylbenzyl or 2-phenyl-ethyl. Benzyl and α,α-dimethylbenzyl are preferred.

Unsubstituted or $C_1$-$C_4$ alkyl-substituted $C_5$-$C_{12}$ cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl, cyclooctyl, cyclononyl, cyclodecyl, cycloundecyl or cyclododecyl. Preference is given to cyclohexyl and tert-butylcyclohexyl.

Alkoxy having up to 18 carbon atoms is a branched or unbranched radical, for example methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. Preference is given to alkoxy having 1 to 12, especially 1 to 8, for example 1 to 6 carbon atoms.

Of particular interest are colorant compositions wherein the at least one organic phosphorous stabilizer is a compound selected from the formulae (1), (2), (5) and (6), in which
n is the number 2, and y is the number 1, 2 or 3;
$A_1$ is $C_2$-$C_{18}$ alkylene, p-phenylene or p-biphenylene,
E, if y is 1, is $C_1$-$C_{18}$alkyl, $—OR_1$ or fluorine;
E, if y is 2, is p-biphenylene,
E, if y is 3, is $N(CH_2CH_2O—)_3$,
$R_1$, $R_2$ and $R_3$ independently of one another are $C_1$-$C_{18}$ alkyl, $C_7$-$C_9$ phenylalkyl, cyclohexyl, phenyl, or phenyl substituted by 1 to 3 alkyl radicals having a total of 1 to 18 carbon atoms;
$R_{14}$ is hydrogen or $C_1$-$C_8$ alkyl,
$R_{15}$ is hydrogen or methyl;
X is a direct bond,
Y is oxygen,
Z is a direct bond or $—CH(R_{16})—$, and
$R_{16}$ is $C_1$-$C_4$ alkyl.

Likewise of interest are colorant compositions wherein the at least one organic phosphorous stabilizer is a compound selected from the formulae (1), (2), (5) and (6), in which
n is the number 2 and y is the number 1 or 3;
$A_1$ is p-biphenylene, E, if y is 1, is $C_1$-$C_{18}$ alkoxy or fluorine,
E, if y is 3, is $N(CH_2CH_2O—)_3$,
$R_1$, $R_2$ and $R_3$ independently of one another are $C_1$-$C_{18}$ alkyl, or phenyl substituted by 2 or 3 alkyl radicals having a total of 2 to 12 carbon atoms;
$R_{14}$ is methyl or tert-butyl;
$R_{15}$ is hydrogen;
X is a direct bond;
Y is oxygen; and
Z is a direct bond, methylene or —$CH(CH_3)$—.

Particular preference is given to colorant compositions wherein the at least one organic phosphorous stabilizer is a compound selected from the formulae (1), (2) and (6).

Special preference is also given to are colorant compositions wherein the at least one organic phosphorous stabilizer is at least one compound of the formula (I)

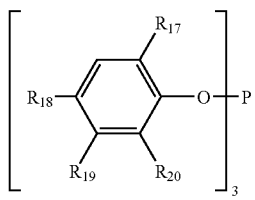

(I)

wherein
$R_{17}$ and $R_{18}$ independently of one another are hydrogen, $C_1$-$C_8$ alkyl, cyclohexyl or phenyl, and
$R_{19}$ and $R_{20}$ independently of one another are hydrogen or $C_1$-$C_4$ alkyl.

The following compounds are examples of organic phosphites and phosphonites which are particularly suitable as the at least one organic phosphorous stabilizer within the meaning of the present invention.

Triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite (IRGAFOS® 168, Ciba Specialty Chemicals Corp.), diisodecyl pentaerythritol diphosphite, bis(2,4-di-tert-butylphenyl) pentaerythritol diphosphite (formula (D)), bis(2,6-di-tert-butyl-4-methylphenyl) pentaerythritol diphosphite (formula (E)), bisdodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl)-4,4'-biphenylene-diphosphonite (IRGAFOS® P-EPQ, Ciba Specialty Chemicals Corp., formula (H)), 6-isooctyloxy-2,4,8,10-tetra-tert-butyl-dibenzo[d,f][1,3,2]dioxaphosphepin (formula (C)), 6-fluoro-2,4,8,10-tetra-tert-butyl-12-methyl-dibenzo[d,g][1,3,2]dioxaphosphocin (formula (A)), bis(2,4-di-tert-butyl-6-methylphenyl)methyl phosphite, bis(2,4-di-tert-butyl-6-methylphenyl)ethyl phosphite (formula (G)).

More preferably, the at least one organic phosphorous stabilizer is at least one organic phosphite or phosphonites selected from the group consisting of tris(2,4-di-tert-butylphenyl) phosphite, tris(nonylphenyl) phosphite and formulae (A), (B), (C), (D), (E), (F), (G), (H), (J), (K) and (L)

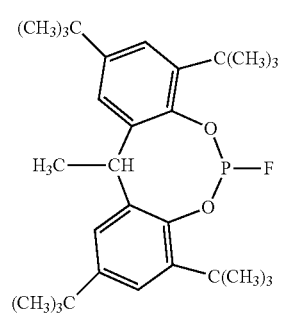

(A)

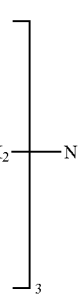

(B)

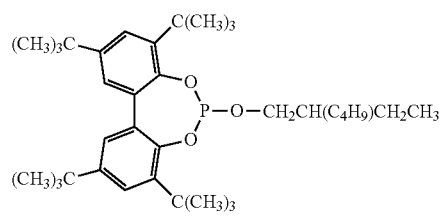

(C)

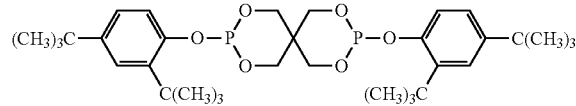

(D)

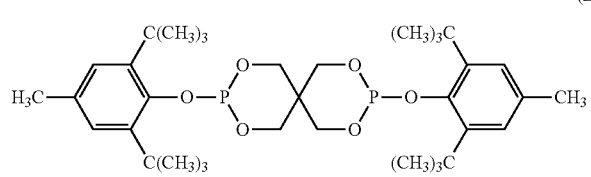

(E)

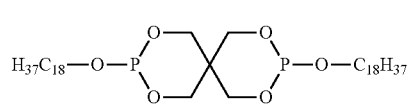

(F)

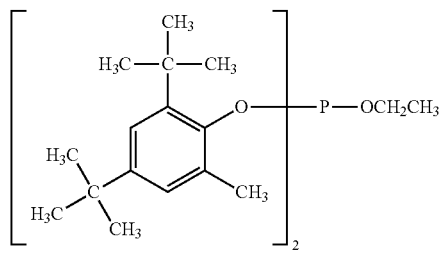

(G)

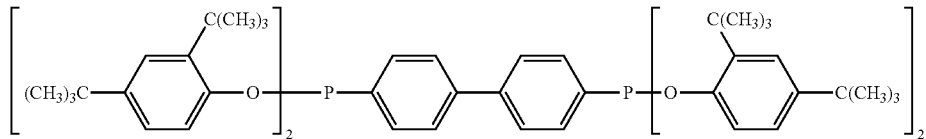

(H)

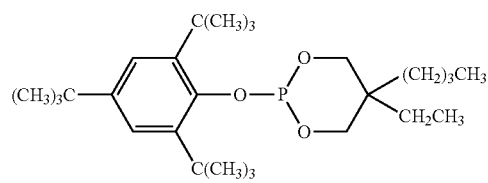

(J)

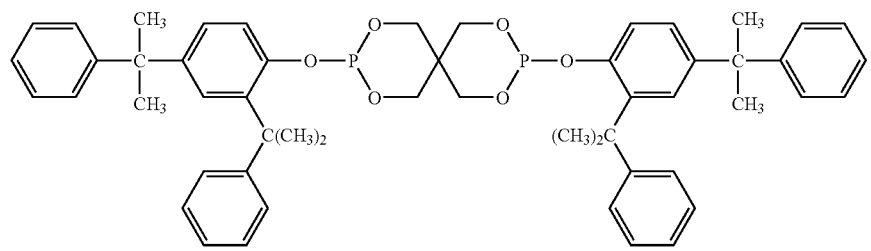

(K)

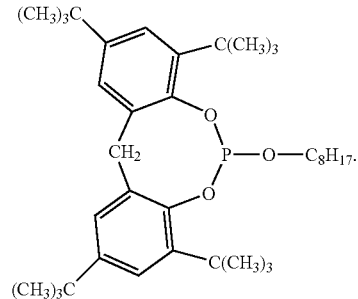

(L)

Very particular preference is given to the organic phosphorous stabilizers: Tris(2,4-di-tert-butylphenyl) phosphite (IRGAFOS® 168, Ciba Specialty Chemicals Corp.), bis(2,4-di-tert-butyl-6-methylphenyl)ethyl phosphite (IRGAFOS® 38, Ciba Specialty Chemicals Corp., formula (G)), bis(2,4-di-tert-butylphenyl) pentaerythritol diphosphite (IRGAFOS® 126, Ciba Specialty Chemicals Corp. and ULTRANOX® 626, GE Chemicals, formula (D)), tetrakis(2,4-di-tert-butylphenyl)-4,4'-biphenylene diphosphonite (IRGAFOS® P-EPQ, Ciba Specialty Chemicals Corp., formula (H)), 2,2', 2"-nitrilo[triethyltris(3,3'5,5'-tetra-tert-butyl-1,1'-biphenyl-2,2'-diyl)phosphite] (IRGAFOS® 12, Ciba Specialty Chemicals Corp., formula (B)). ULTRANOX® 641 (GE Chemicals, formula (J)), DOVERPHOS® S9228 (Dover Chemicals, formula (K)) or MARK® HP10 (Adeka Argus, formula (L)).

These organic phosphites and phosphonites are known compounds; many of them are commercially available.

The colorant composition, described hereinbefore, preferably contains the at least one organic phosphorous stabilizer in an amount of from 1 pph to 300 pph, more preferably from 5 pph to 60 pph by weight based on the weight of the at least one bismuth-containing inorganic pigment.

The at least one organic phosphorous stabilizer may be employed to provide improved heat stability to a formulated thermosetting powder coating composition, or likewise, may be added directly to an inorganic bismuth-containing pigment, and thereby provide improved heat stability to a subsequent formulated thermal curable composition.

In a second aspect, the present invention relates to a thermosetting powder coating composition comprising of:

(i) the colorant composition described hereinbefore, (ii) at least one thermally polymerizable thermosetting powder coating resin, and (iii) at least one crosslinker.

Preferably, the at least one organic phosphorous stabilizer is present in the inventive thermosetting powder coating composition from about 1 pph to about 20 pph by weight, based on the total weight of the thermosetting powder coating composition.

The term "powder coating compositions" or "powder coatings" is understood as meaning the definition as is described in "Ullmann's Encyclopedia of Industrial Chemistry, 5th, Completely Revised Edition, Vol. A 18", pages 438 to 444 (1991) under section 3.4. By powder coatings there are meant thermoplastic or stovable, crosslinkable polymers which are applied in powder form to predominantly metallic substrates. The manner in which the powder is brought into contact with the workpiece to be coated characterizes the various application techniques, for example electrostatic powder spraying with corona or triboelectric pistols, electrostatic fluidized-bed sintering or by using magnetic brush technology.

There are various types of thermosetting powder compositions. The best known compositions contain either a mixture of carboxyl group-containing polymers, such as a carboxyl group-containing polyester or polyacrylate, and epoxy compounds, such as triglycidyl isocyanurate, glycidyl group-containing acrylic copolymers or beta-hydroxyalkylamides or a mixture of hydroxyl group-containing polymers, most often a hydroxyl group-containing polyester, with blocked or non-blocked isocyanates, melamine resins, and the like.

The carboxyl group-containing or the hydroxyl group-containing polyesters suitable for use in the preparation of powdered varnishes and paints have already been described in numerous publications such as articles and patents.

These polyesters are usually prepared from aromatic dicarboxylic acids, mainly terephthalic acid and isophthalic acid and optionally a minor proportion of aliphatic or cycloaliphatic dicarboxylic acids, and from various polyols such as ethylene glycol, neopentyl glycol, 1,6-hexanediol, trimethylolpropane, and the like.

These polyesters based on aromatic dicarboxylic acids, when they are used with an appropriate cross-linking agent, provide thermosetting compositions giving paint and varnish coatings possessing good properties, both as regards their appearance and as regards their mechanical properties such as impact resistance, flexibility, etc.

Preferably, the at least one thermally polymerizable thermosetting powder coating resin (ii) is a hydroxyl group-containing polymer, more preferably a hydroxyl group-containing polyester and the at least one crosslinker (iii) is a blocked or non-blocked isocyanate or a melamine resin.

Preferably, the at least one thermally polymerizable thermosetting powder coating resin (ii) is a carboxyl group-containing polymer, more preferably a carboxyl group-containing polyester or polyacrylate and the at least one crosslinker (iii) is an epoxy compound, more preferably triglycidyl isocyanurate, a glycidyl group-containing acrylic copolymer or a beta-hydroxyalkylamide.

Suitable organic film-forming binders for the thermosetting powder coating compositions according to the present invention are stoving systems based on, for example, epoxy resins, polyester-hydroxyalkylamides, polyester-glycolurils, epoxy-polyester resins, polyester-triglycidyl isocyanurates, hydroxy-functional polyester-blocked polyisocyanates, hydroxy-functional polyester-uretdiones, acrylate resins with hardener or mixtures of such resins. Also of interest are film-forming binders having thermoplastic properties, for example polyethylene, polypropylene, polyamides, polyvinyl chlorides, polyvinylidene dichloride or polyvinylidene difluoride.

Polyesters are generally hydroxy- or carboxy-functional and are usually prepared by condensation of diols and dicarboxylic acids. The addition of polyols and/or polyacids produces branched polyesters which then, on stoving in the presence of crosslinkers, give rise to network structures which impart to the coating the desired physical properties, such as scratch resistance, impact strength and flexural strength. Instead of multifunctional acids it is also possible to use anhydrides or acid chlorides, for example maleic anhydride, itaconic anhydride, phthalic anhydride, terephthalic anhydride, hexahydroterephthalic anhydride, trimellitic anhydride, pyromellitic dianhydride, succinic anhydride, etc. It is also possible to use simple esters, for example dimethyl terephthalate, polymerization proceeding by transesterification with elimination of the volatile alcohol. Likewise practicable is preparation by a combination of transesterification and condensation. Furthermore, polyesters can be prepared by polycondensation of hydroxycarboxylic acids, for example 12-hydroxystearic acid and hydroxypivalic acid, or the corresponding lactones, for example ε-caprolactone. Examples of dicarboxylic acids and polyacids include terephthalic acid, isophthalic acid, adipic acid, azelaic acid, sebacic acid, 1,12-dodecanedioic acid, pyromellitic acid, 3,6-dichlorophthalic acid, succinic acid, 1,3-cyclohexanedicarboxylic acid and 1,4-cyclohexanedicarboxylic acid. Examples of diols and polyols include ethylene glycol, propylene glycol, glycerol, hexanetriol, hexane-2,5-diol, hexane-1,6-diol, pentaerythritol, sorbitol, neopentylglycol, trimethylolethane, trimethylolpropane, tris-1,4-cyclohexanedimethanol, trimethylpentanediol, 2,2-diethyl-1,3-propanediol, 2-methyl-2-butyl-1,3-propanediol, Esterdiol 204 (ester of hydroxypivalic acid and neopentylglycol), hydrogenated bisphenol A, bisphenol A, hydroxypivalic acid, hydroxypivalate esters, 2-butyl-2-ethyl-1,3-propanediol, 1,4-butanediol, 2-butene-1,4-diol, 2-butyne-1,4-diol or 2-methyl-1,3-propanediol.

The carboxyl functional polyester is preferably characterised by:
(a) an acid number from 15 to 70 mg KOH/g, preferably from 20 to 45 mg KOH/g and more preferably from 25 to 35 mg KOH/g,
(b) a number average molecular weight ranging from 1600 to 8600, preferably from 2200 to 7000 and more preferably from 3200 to 6500 as measured by gel permeation chromatography (GPC),
(c) a glass transition temperature Tg from 40 to 80° C. and preferably from 50 to 70° C. as measured by differential scanning calorimetry (DSC) according to ASTM D3418 with a heating gradient of 20° C. per minute and
(d) a Brookfield (cone/plate) viscosity according to ASTM D4287, measured at 200° C., ranging from 5 to 20000 mPa*s.

Suitable crosslinking agents for carboxy-functional polyesters are epoxy compounds, for example NOVOLA®-epoxy resins, diglycidyl ethers of bisphenol A, hydrogenated bisphenol A and bisphenol A modified by reaction with, for example, aliphatic dicarboxylic acids. Also suitable are reactive epoxy compounds, such as triglycidyltriazolidine-3,5-dione, the glycidyl esters of polyacids, for example diglycidyl terephthalate and diglycidyl hexahydroterephthalate, hydantoin epoxides (U.S. Pat. No. 4,402,983) and, very particularly, triglycidyl isocyanurate and aliphatic polyepoxy compounds and also epoxidized polyunsaturated fatty acid esters. Other crosslinking agents for carboxy-functional polyesters are β-hydroxyalkylamides (see U.S. Pat. No. 4,076,917), for example the primarily tetrafunctional β-hydroxyalkylamide derivative of adipic acid (PRIMID® XL552 and PRIMID® QM 1260 from EMS Chemie). Derivatives of melamine, benzoguanimine and glycoluril, which are alkylated with low molecular mass alcohols have also been found to be suitable. Examples are tetramethylmethoxyglycoluril (POWDER- LINK® 1174 from American Cyanamid). Other known crosslinking agents are bis- and trisoxazolidines, for example 1,4-bisoxazolidinobenzene.

Recent substances are carboxy-functional polyesters which include chemically bonded epoxy groups and as a consequence are able to crosslink with themselves (Molhoek et al., 22nd Fatipec Congress, 15.-19.5.95, Budapest, Vol. 1, 119-132).

In all systems in which an epoxy group or a glycidyl radical reacts with a carboxyl group or with an anhydride in a crosslinking reaction, catalysts can be employed. Examples are amines or metal compounds, for example aluminium acetylacetonate or tin octoate.

As crosslinking agents for hydroxy-functional polyesters the polyisocyanate crosslinkers are of particular importance. In order to prevent premature crosslinking owing to the high reactivity of isocyanates and in order to obtain good levelling of the melted powder, the polyisocyanates are blocked (internally as a uretdione or as an adduct with a blocking agent). Blocking agents most frequently employed are caprolactam, methyl ethyl ketoxime or butanone oxime. Other suitable blocking agents for isocyanates are described in the publications by G. B. Guise, G. N. Freeland and G. C. Smith, J. Applied Polymer Science, 23, 353 (1979) and of M. Bock and H.-U. Maier-Westhues in "Progress in Product Development for Powder Coating Technology, XIXth Int. Conf. on Organic Coatings, Science and Technol., Athens, 12-16 Jul.", 1993. Examples of blocked and unblocked polyisocyanates include 2-methylpentane 1,5-diisocyanate, 2-ethylbutane 1,4-diisocyanate, 3(4)-isocyanatomethyl-1-methylcyclohexyl isocyanate, 3-isocyanatomethyl-3,5,5-trimethylcyclohexane diisocyanate, tris(isocyanatomethyl)benzene, 4,4'-diisocyanatodicyclohexylmethane, 1,4-bis(isocyanatomethyl)cyclohexane, m-tetramethylxylene diisocyanate, p-tetramethylxylene diisocyanate and, in particular, isophorone diisocyanate. For reaction of the unblocked diisocyante it is common to add a metallic catalyst, for example tin octoate, dibutyltin oxide or dibutyltin dilaurate, to the polyisocyanate formulation.

Further suitable crosslinking agents for hydroxy-functional polyesters are anhydrides, for example trimellitic anhydride and its reaction products with diols and diamines. Further examples of such crosslinking agents are described by T. A. Misev in "Powder Coatings: Chemistry and Technology", J. Wiley & Sons, Chichester on pages 123 and 124.

Polyacrylates, which commonly have hydroxyl, carboxyl or glycidyl functionality, are also employed as binders for powder coatings. They are prepared by the customary methods, principally from monomers such as, for example, styrene and linear or branched $C_1$-$C_8$ alkyl esters of acrylic acid or methacrylic acid. Other ethylenically unsaturated compounds, for example divinylbenzene, acrylamide, methacrylamide, butoxymethylacrylamide, acrylonitrile, butadiene, etc., can also be added and copolymerized. Hydroxyl functionality is ensured by the copolymerization of hydroxy-functional monomers, for example hydroxyethyl acrylate, hydroxyethyl methacrylate, hydroxypropyl acrylate, hydroxypropyl methacrylate. For carboxyl functionality, ethylenically unsaturated acids and anhydrides are used, for example acrylic acid, methacrylic acid, itaconic acid, crotonic acid, maleic anhydride, itaconic anhydride, acrylic anhydride or methacrylic anhydride (U.S. Pat. No. 3,836,604). Glycidyl functionality is given, as taught in EP-A-0 256 369 and U.S. Pat. No. 3,876,578, by the copolymerization of monomers such as glycidyl acrylate and glycidyl methacrylate. As crosslinking agents for polyacrylates with hydroxyl or carboxyl functionality it is possible in principle to use the same compounds as already described for the polyesters with hydroxyl or carboxyl functionality. Further suitable crosslinking agents are the epoxy compounds of U.S. Pat. No. 0,045,040. Suitable crosslinking agents for polyacrylates with glycidyl functionality are dicarboxylic acids, for example sebacic acid, 1,12-dodecanedicarboxylic acids, and anhydrides, for example bistrimellitic anhydride, and the compounds described in U.S. Pat. No. 3,880,946. Furthermore, autocrosslinking polyacrylates from DE-A-3 310 545 are also known.

Epoxy resins for powder coatings are mostly either NOVOLAC®-epoxy resins or, in particular, those based on aromatic polyols, especially those based on bisphenol such as bisphenol A. Also known are modified bisphenol-epoxy resins, from JP-A-58 187 464 (1982). The epoxy resins are employed in combination with crosslinkers from the classes of the solid aliphatic amines, solid aromatic amines, amine adducts, phenolic resins, polyacids and the carboxy-functional polyesters already described. Very particular mention as hardeners is to be made of the dicyandiamides, which are frequently employed together with a catalyst such as Lewis acids, boron trifluoride-amine complexes, metal complexes, tertiary or quaternary amines, and imidazoline derivatives, such as 2-methylimidazoline.

In the thermosetting powder coating compositions according to the present invention the resin and the crosslinking agent are employed judiciously in approximately stoichiometric amounts. Deviation from the stoichiometric amounts by more than 30 pph leads in most cases to a decrease in the desired physical properties of the cured coating film, for example flexibility, impact strength, adhesion, weathering resistance or solvent resistance.

Preference is given to thermosetting powder coating compositions wherein the mixture of components (ii) and (iii) comprises from 70 to 98 pph by weight, more preferably 85 to 98 pph by weight of a carboxyl group-containing polyester and from 30 to 2 pph, more preferably 15 to 2 pph by weight of one or more epoxy and/or beta-hydroxyalkylamide group containing cross-linkers.

Preferably, the inventive thermosetting powder coating compositions include, as further additives, one or more components from the group of the dyes, fillers, waxes, levelling assistants, degassing agents, charge control agents, optical brighteners, adhesion promoters, antioxidants, light stabilizers, curing catalysts or photoinitiators. The inventive powder coating compositions may also include corrosion inhibitors, for example anticorrosion pigments, such as phosphate- or borate-containing pigments or metal oxide pigments, or other organic or inorganic corrosion inhibitors, for example salts of nitroisophthalic acid, phosphoric esters, technical-grade amines or substituted benzotriazoles.

Special preference is given to thermosetting powder coating compositions, which comprise at least one further component selected from the group consisting of UV light absorbers, hindered amine light stabilisers, flow control agents, degassing agents and fillers.

Suitable photoinitiators for thermosetting powder coating compositions, which are cured, for example, with UV light are those based on benzophenones, phenylglyoxalates, bis- and/or mono-acylphosphine oxides, α-hydroxy ketones or benzil dimethyl ketals. As light sources it is judicious to employ medium-pressure or high-pressure mercury lamps.

Examples of degassing agents are fatty acid amides as described in EP-A-0 471 409, ε-caprolactam, methyl isophthalate and dimethyl isophthalate (EP-A-284 996) and, very particularly, benzoin.

Examples of levelling assistants are epoxidized fatty acids, abietyl alcohol, polylauryl methacrylate, polylauryl acrylate, polydimethylsiloxane-polyalkylene oxide block copolymers or, in particular, polymers and copolymers of low molecular weight of $C_1$-$C_8$ alkyl acrylate esters or alkyl methacrylate esters.

Adhesion promoters are based, for example, on modified silanes, titanates or zirconates.

An example of an optical brightener is UVITEX® OB (Ciba Specialty Chemicals Corp.).

Examples of fillers are talc, alumina, aluminium silicate, aluminium phosphate, barytes, mica, lithopone, silica, calcium carbonate or magnesium carbonate, magnesium oxide, zinc oxide, zinc carbonate, zinc phosphate or mixtures thereof.

Particularly preferred thermosetting powder coating compositions according to this invention comprise as further additives antioxidants. Examples of such compounds include the following:

1. Antioxidants 1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenol, for example 2,6-di-nonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis (6-tert-butyl-2-methylphenol), 4,4'-thiobis(3,6-di-sec-amylphenol), 4,4'-bis(2,6-dimethyl-4-hydroxyphenyl) disulfide.

1.6. O—N- and S-benzyl compounds, for example 3, 5,3',5'-tetra-tert-butyl-4,4'-dihydroxydibenzyl ether, octadecyl 4-hydroxy-3,5-dimethylbenzylmercaptoacetate, trideyl 4-hydroxy-3,5-di-tert-butylbenzylmercaptoacetate tris(3,5-di-tert-butyl-4-hydroxybenzyl)amine, bis(4-tert-butyl-3-hydroxy-2,6-di methyl benzyl)dithioterephthalate, bis(3,5-di-tert-butyl-4-hydroxybenzyl) sulfide, isooctyl 3,5-di-tert-butyl-4-hydroxybenzylmercaptoacetate.

1.7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, di-dodecyl mercaptoethyl-2,2-bis(3,5-di-tert-butyl-4-hydroxybenzyl)malonate, di-[4-(1,1,3,3-tetramethylbutyl)phenyl]2,2-bis(3,5-di-tert-butyl-4-hydroxybenzyl)malonate.

1.8. Aromatic hydroxybenzyl compounds, for example 1, 3,5-tris(3,5-di-tert-butyl-4-hydroxybenzyl)-2,4,6-trimethylbenzene, 1,4-bis(3,5-di-tert-butyl-4-hydroxybenzyl)-2,3,5, 6-tetramethylbenzene, 2,4,6-tris(3,5-di-tert-butyl-4-hydroxybenzyl)phenol.

1.9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1, 3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurat, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.10. Benzylphosphonates, for example dimethyl 2,5-di-tert-butyl-4-hydroxybenzyl-phosphonate, diethyl 3,5-di-tert-butyl-4-hydroxybenzyl phosphonate, dioctadecyl 3,5-di-tert-butyl-4-hydroxybenzylphosphonate, dioctadecyl 5-tert-butyl-4-hydroxy-3-methylbenzylphosphonate, the calcium salt of the monoethyl ester of 3,5-di-tert-butyl-4-hydroxybenzylphosphonic acid.

1.11. Acylaminophenols, for example 4-hydroxylauranilide, 4-hydroxystearanilide, octyl N-(3,5-di-tert-butyl-4-hydroxyphenyl)carbamate.

1.12. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.13. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl)propionic acid e.g. N,N'-bis(3,5-di-tert-butyl-4-hydroxyphenyl-propionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

The phenolic antioxidants are added, for example, in concentrations of from 0.01 to 10 pph, based on the overall weight of the powder coating composition.

Especially preferred are thermosetting powder coating compositions, which additionally contain a benzofuran-2-one or a phenolic antioxidant.

The thermosetting powder coating compositions are applied to the substrate in accordance with the customary techniques, especially electrostatic powder spraying. The powder sprayed out from the spray gun is electrostatically charged at a high-voltage electrode and is drawn to the workpiece under the action of the air flow and of the electrostatic force of attraction. The wraparound effect of the field lines ensures that undercuts and reverse sides are coated too. The applied particles, which adhere as a result of Coulomb forces, are melted together in an oven and cured. The preferred stoving temperatures are between 130 and 260° C., in particular between 140 and 220° C., depending on the reactivity of the film-forming binder (resin/hardener system) and on the oven construction. The stoving times are judiciously in a range from 2 to 30 minutes, the heat capacity of the substrate playing a large part. In the case of UV-curable systems, the powder coating composition—after the powder spraying operation—is melted, for example with infrared radiation, at a temperature of from 50 to 180° C. The coating is then exposed to UV light, preferably prior to cooling. In powder coil coating applications, short exposures to high temperatures in the range of 300 to 400° C. are used to cure the powder.

Thermosetting powder coating compositions according to the invention are suitable for all kinds of substrates, for example metal, MDF boards, glass and ceramics to which a coating is to be applied.

Typical metal substrates can be Cold-Rolled or Hot-Rolled steel including different conversion coatings of steel for example Iron Phosphate or Zinc Phosphate, Aluminum and its conversion coatings like Iron Phosphate when aluminum is processed together with steel, Zinc Phosphate, Chromium Phosphate, Chromate, Non-Chromate and Galvanized Steel.

Special preference is given to metallic substrates selected from the group consisting of iron, steel, copper, zinc, tin, magnesium, silicon, titanium or aluminium, and alloys thereof.

The preparation of the thermosetting powder coating compositions according to this invention can be accomplished by the customary methods. A good description of the operations and the machines is given in chapter 5 of T. A. Misev's book: "Powder Coatings: Chemistry and Technology", J. Wiley & Sons, Chichester.

In general, all components of the thermosetting powder coating composition are weighed out and mixed together in an appropriate mixer. This is done using tumble mixers, conical mixers, double-cone mixers, horizontal mixers, blenders and stirring apparatus such as planetary mixers.

The formulation is first of all processed in a heated extruder to give a highly homogeneous, melted composition. Machines suitable for this purpose comprise single-screw co-compounders, twin-screw extruders and planetary extruders. Metering is usually effected by means of a screw conveyor, a conveyor belt or a shaker trough at a temperature of 70-140° C., especially 80-110° C. Following extrusion the hot mass is rolled out and cooled, for example on a cooling belt. When it has solidifed, the mass is crushed and then ground. Suitable grinding units are pinned-disc mills, ultra-centrifugal mills, jet mills and, especially, classifying mills. The powder is subsequently classified and preferably sieved. Prior to sieving it is also possible to add anticaking agents such as, for example, silica gel or alumina, or special-effect pigments, for example aluminium, bronze or mica.

The average particle size of the thermosetting powder coating composition of the present invention is from 5 to 200 µm, in particular 10 to 100 µm, e.g. from 15 to 75 µm.

Other techniques for the preparation of powder coatings (EP-B-368851 or WO-A-92/00342) have recently been disclosed which can also be employed for this invention. In these techniques, the premixed formulation or extrudate is fed to a heated rotary tube and is spun out centrifugally on a rotary table. At the edge of the table, small, round, virtually monodisperse drops are formed which solidify in cooled air before falling to the floor.

The thermosetting powder coating compositions are applied by the methods customary in practice. It is possible, for example, to use corona guns and also triboelectric spray guns. Also employable are all variants of the fluidized sintering technique, with and without electrostatic charging. For thermoplastic powder coatings, flame-spraying techniques can also be employed.

The stoving of the thermosetting powder coating composition can, in addition to the gas oven, also be carried out by means of infrared heating or by electrical radiators.

The amount applied (layer thickness) and the type of substrate used (layer substrate) depends of the desired field of application. The layer thickness is usually in the range from about 30 to 120 µm.

In a third aspect, the present invention relates to paint or varnishes compositions obtained from the thermosetting powder coating composition, described hereinbefore.

In a fourth aspect, the present invention relates to a method for coating an article, characterised in that the thermosetting powder coating composition, described hereinbefore is applied by an electrostatic or friction charging gun, or in a fluidised bed, and in that the coating thus obtained is heated at a temperature of from 140 to 250° C.

In a fifth aspect, the present invention relates to an entirely or partially substrate coated by the process, described hereinbefore.

In a sixth aspect, the present invention relates to a method of reducing the discoloration of a thermosetting powder coating composition comprising at least one thermally polymerizable thermosetting powder coating resin, at least one crosslinker and at least one bismuth-containing inorganic pigment, which comprises incorporating in or applying to these composition an organic phosphorous stabilizer.

In the process of curing of the inventive thermosetting powder coating compositions, thermal energy is used. The curing-temperature can be achieved by means of electrical heated ovens, direct gas fired ovens or IR-irradiation. The time and temperature needed for standard curing conditions can vary depending on the end use requirement and type of formulation e.g. about 10 min at 160° C. to 10 min at 200° C.

The inventive colorant compositions as well as the inventive thermosetting powder coating compositions comprising them are advantageously used where there is a need for heat resistant coatings and where only minor surface modifications during over bake conditions are acceptable. As minor surface modifications are regarded a color change below dE 1.0 to standard curing conditions, gloss retention below 10 pph to standard curing conditions and no surface defects like pin holes, cratering or reflow of the applied coating. Over bake conditions are curing conditions >15 min at 180° C., >15 min >180° C., >10 min at 200° C. or about 5 min to 10 min >200° C. or >10 min >200° C.

Achievable over bake curing conditions without getting any coating surface defects are shown in Table 1. The results illustrate the influence of decreasing amounts of an organic phosphorous containing stabilizer according to the present invention in a thermosetting powder coating composition. The evaluation of the coating surface is done by visual assessment. Therefore the sample cured at standard conditions (30 minutes at 180° C.) is compared against the samples cured at the different over bake conditions. The sample passes this assessment when no difference in leveling, gloss, surface defects like cratering and pin holes are observed.

TABLE 1

| Amount of bismuth vanadate pigment 1 | Stabilization | Achievable over bake curing conditions |
|---|---|---|
| 20 pph | 15 pph calculated on weight of bismuth vanadate pigment 1 | 10 min at 180° C./20 min at 180° C./30 min at 180° C. 10 min at 200° C./20 min at 200° C./30 min at 200° C. 10 min at 220° C./20 min at 220° C. |
| 20 pph | 10 pph calculated on weight of bismuth vanadate pigment 1 | 10 min at 180° C./20 min at 180° C./30 min at 180° C. 10 min at 200° C./20 min at 200° C./30 min at 200° C. 10 min at 220° C. |
| 20 pph | 5 pph calculated on weight of bismuth vanadate pigment 1 | 10 min at 180° C./20 min at 180° C./30 min at 180° C. 10 min at 200° C./20 min at 200° C. |
| 20 pph | — | 10 min at 180° C./20 min at 180° C./30 min at 180° C. |

EXAMPLES

The following compounds are employed in the working examples. Unless otherwise indicated, all parts and percentages are by weight.
Thermal curable resins: R1 Polyester resin URALAC® P 3495
R2 Epoxy crosslinker ARALDIT® PT-910
Pigments: Bismuth vanadate pigment 1: IRGAZIN® Yellow 2093 (P.Y. 184)
Bismuth vanadate pigment 2: IRGAZIN® Yellow 2094 (P.Y. 184)
Blanc fixe (Barium sulphate inert filler material)
Stabilizer: Tetrakis(2,4-di-tert-butylphenyl)-4,4'-biphenylene diphosphonite (IRGAFOS®P-EPQ, Ciba Specialty Chemicals Corp.)

Example 1

A thermal curable powder coating is prepared with a 93:7 weight mixture of resins R1:R2 and 20 pph by weight of bismuth vanadate pigment 1 (BiVa) and 10 pph by weight of Blanc fixe on total formulation. The unstabilized composition exhibits an achievable curing condition of up to about 30 minutes at 180° C. Stabilized formulations with IRGAFOS®P-EPQ at a concentration from about 5 to 15 pph by weight calculated on weight of bismuth vanadate pigment 1, exhibit an achievable curing condition of up to about 20 minutes at 220° C.

Example 2

A thermal curable powder coating is prepared with a 93:7 weight mixture of resins R1:R2 and about 5 pph 10 pph 15 pph and 20 pph by weight of bismuth vanadate pigment 2 with about 25 pph, 20 pph, 15 pph and 10 pph by weight of Blanc fixe on total formulation. These formulations have been tested stabilized and non-stabilized. The unstabilized composition exhibits an achievable curing condition of up to about 10 minutes at 200° C. for the compositions with 10 pph, 15 pph and 20 pph bismuth vanadate pigment 2 and of up to about 20 minutes at 200° C. for the composition with 5 pph bismuth vanadate pigment 2. Stabilized formulations with IRGAFOS® P-EPQ at a concentration of 15 pph by weight calculated on weight of bismuth vanadate pigment 2, exhibit an achievable curing condition of up to about 10 minutes at 220° C. and about 30 minutes at 200° C. for composition with 5 pph bismuth vanadate pigment 2.

Achievable over bake curing conditions without getting any coating surface defects are shown in Table 2. The results illustrate the influence of stabilization with an organic phosphorous containing stabilizer according to the present invention in varying compositions. The evaluation of the coating surface is done by visual assessment. Therefore the sample cured at standard conditions (30 minutes at 180° C.) is compared against the samples cured at the different over bake conditions. The sample passes this assessment when no difference in leveling, gloss, surface defects like cratering and pin holes are observed.

TABLE 2

| Amount of bismuth vanadate pigment 2 | Stabilization | Achievable over bake curing conditions |
|---|---|---|
| 20 pph | 15 pph calculated on weight of bismuth vanadate pigment 2 | 10 min at 180° C./20 min at 180° C./30 min at 180° C. 10 min at 200° C./20 min at 200° C./30 min at 200° C. 10 min at 220° C. |
| 20 pph | — | 10 min at 180° C./20 min at 180° C./30 min at 180° C. 10 min at 200° C. |
| 15 pph | 15 pph calculated on weight of bismuth vanadate pigment 2 | 10 min at 180° C./20 min at 180° C./30 min at 180° C. 10 min at 200° C./20 min at 200° C./30 min at 200° C. 10 min at 220° C. |
| 15 pph | — | 10 min at 180° C./20 min at 180° C./30 min at 180° C. 10 min at 200° C. |
| 10 pph | 15 pph calculated on weight of bismuth vanadate pigment 2 | 10 min at 180° C./20 min at 180° C./30 min at 180° C. 10 min at 200° C./20 min at 200° C./30 min at 200° C. 10 min at 220° C. |
| 10 pph | — | 10 min at 180° C./20 min at 180° C./30 min at 180° C. 10 min at 200° C. |
| 5 pph | 15 pph calculated on weight of bismuth vanadate pigment 2 | 10 min at 180° C./20 min at 180° C./30 min at 180° C. 10 min at 200° C./20 min at 200° C./30 min at 200° C. |
| 5 pph | — | 10 min at 180° C./20 min at 180° C./30 min at 180° C. 10 min at 200° C./20 min at 200° C. |

What is claimed is:

1. A colorant composition comprising of:
   (i) at least one bismuth-containing inorganic pigment, and
   (ii) at least one organic phosphorous containing stabilizer, wherein the at least one organic phosphorous containing stabilizer is at least one organic phosphite or phosphonite selected from the group consisting of tris(2,4-di-tert-butylphenyl) phosphite, tris(nonylphenyl) phosphite and the formulae

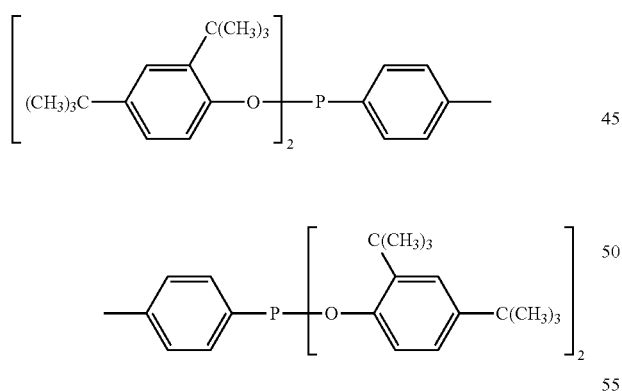

in an amount of from 1 pph to 300 pph by weight based on the weight of the at least one bismuth-containing inorganic pigment.

2. The colorant composition of claim 1, wherein the at least one bismuth-containing inorganic pigment is at least one bismuth vanadate pigment or $BiVO_4$-containing mixed phase pigment.

3. The colorant composition of claim 1, wherein the at least one organic phosphorous containing stabilizer is at least one organic phosphite or phosphonite selected from the group consisting of formulae (1), (2), (3), (4), (5), (6) and (7)

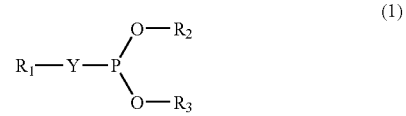

(1)

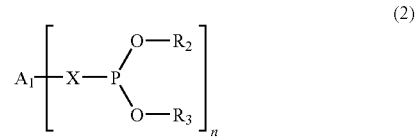

(2)

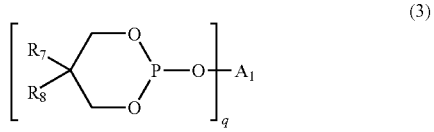

(3)

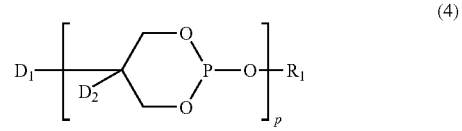

(4)

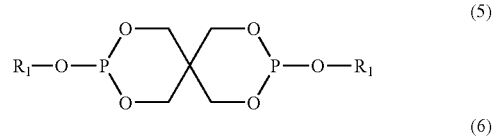

(5)

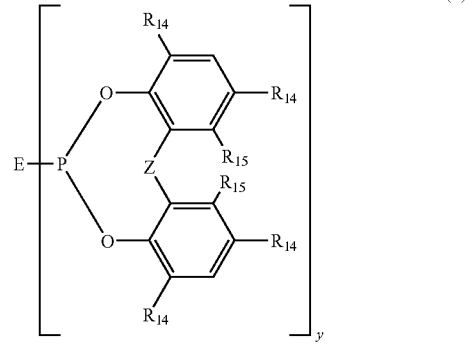

(6)

-continued

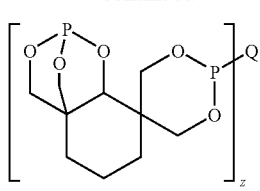
(7)

in which the indices are integral and
n is 2, 3 or 4; p is 1 or 2; q is 2 or 3; r is 4 to 12; y is 1, 2 or 3; and z is 1 to 6;
$A_1$, if n is 2, is $C_2$-$C_{18}$ alkylene; $C_2$-$C_{12}$ alkylene interrupted by oxygen, sulfur or —$NR_4$—;
a radical of the formula

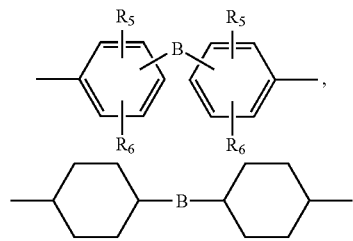

or phenylene;
$A_1$, if n is 3, is a radical of the formula —$C_rH_{2r-1}$—;
$A_1$, if n is 4, is

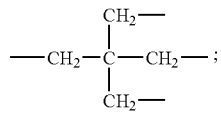

$A_2$ is as defined for $A_1$ if n is 2;
B is a direct bond, —$CH_2$—, —$CHR_4$—, —$CRiR_4$—, sulfur, $C_5$-$C_7$ cycloalkylidene, or cyclohexylidene which is substituted by from 1 to 4 $C_1$-$C_4$ alkyl radicals in position 3, 4 and/or 5;
$D_1$, if p is 1, is $C_1$-$C_4$ alkyl and, if p is 2, is —$CH_2OCH_2$—;
$D_2$, if p is 1, is $C_1$-$C_4$ alkyl;
E, if y is 1, is $C_1$-$C_{18}$ alkyl, —$OR_1$ or halogen;
E, if y is 2, is —O-$A_2$-O—,
E, if y is 3, is a radical of the formula $R_4C(CH_2O$—$)_3$ or $N(CH_2CH_2O$—$)_3$;
Q is the radical of an at least z-valent alcohol or phenol, this radical being attached via the oxygen atom to the phosphorus atom;
$R_1$, $R_2$ and $R_3$ independently of one another are $C_1$-$C_{18}$ alkyl which is unsubstituted or substituted by halogen, —$COOR_4$, —CN or —$CONR_4R_4$; $C_2$-$C_{18}$ alkyl interrupted by oxygen, sulfur or —$NR_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula

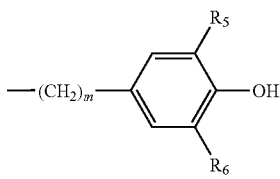

in which m is an integer from the range 3 to 6;
$R_4$ is hydrogen, $C_1$-$C_{18}$ alkyl, $C_5$-$C_{12}$ cycloalkyl or $C_7$-$C_9$ phenylalkyl, $R_5$ and $R_6$ independently of one another are hydrogen, $C_1$-$C_8$ alkyl or $C_5$-$C_6$ cycloalkyl,
$R_7$ and $R_8$, if q is 2, independently of one another are $C_1$-$C_4$ alkyl or together are a 2,3-dehydropentamethylene radical; and
$R_7$ and $R_8$, if q is 3, are methyl;
$R_{14}$ is hydrogen, $C_1$-$C_9$ alkyl or cyclohexyl,
$R_{15}$ is hydrogen or methyl and, if two or more radicals $R_{14}$ and $R_{15}$ are present, these radicals are identical or different;
X and Y are each a direct bond or oxygen,
Z is a direct bond, methylene, —$C(R_{16})_2$— or sulfur, and
$R_{16}$ is $C_1$-$C_8$ alkyl.

4. The colorant composition of claim 1, further comprising at least one inorganic pigment selected from the group consisting of lead chromate pigment, cerium sulfide pigment, rutile pigment and spinel pigment and/or at least one organic pigment selected from the group consisting of anthraquinone pigments, anthrapyrimidine pigments, azo pigments, azomethine pigments, quinacridone pigments, quinophthalone pigments, diketopyrrolopyrrole pigments, indanthrone pigments, isoindoline pigments, isoindolinone pigments, metal complex pigments, perinone pigments, perylene pigments, phthalocyanine pigments, pyranthrone pigments, pyrazoloquinazolone pigments and thioindigo pigments.

5. A thermosetting powder coating composition comprising of:
(i) the colorant composition of any of claim 1,
(ii) at least one thermally polymerizable thermosetting powder coating resin, and
(iii) at least one crosslinker.

6. The thermosetting powder coating composition of claim 5 wherein the at least one thermally polymerizable thermosetting powder coating resin (ii) is a hydroxyl group-containing polymer and the at least one crosslinker (iii) is a blocked or non-blocked isocyanate or a melamine resin.

7. The thermosetting powder coating composition of claim 5 wherein the at least one thermally polymerizable thermosetting powder coating resin (ii) is a carboxyl group-containing polymer and the at least one crosslinker (iii) is an epoxy compound, preferably triglycidyl isocyanurate, a glycidyl group-containing acrylic copolymer or a beta-hydroxyalkylamide.

8. The thermosetting powder coating composition of claim 5 wherein the mixture of components (ii) and (iii) comprises from 70 to 98 pph by weight by weight of a carboxyl group-containing polyester and from 30 to 2 pph by weight of one or more epoxy and/or beta-hydroxyalkylamide group containing cross-linkers.

9. The thermosetting powder coating composition of claim 5 comprising at least one further component selected from the group consisting of UV light absorbers, hindered amine light stabilisers, flow control agents, degassing agents and fillers.

10. A paint or vanishes composition comprising the thermosetting powder coating composition according to claim 5.

11. A method for coating an article characterised in that the thermosetting powder coating composition according to claim 5 is applied by an electrostatic or friction charging gun, or in a fluidised bed, and in that the coating thus obtained is heated at a temperature of from 140 to 250° C.

12. A substrate entirely or partially coated by the process of claim 11.

13. A method of reducing the discoloration of a thermosetting powder coating composition comprising at least one thermally polymerizable thermosetting powder coating resin, at least one crosslinker and at least one bismuth-containing inorganic pigment, which comprises incorporating in or applying to these composition an organic phosphorous containing stabilizer, wherein the at least one organic phosphorous containing stabilizer is at least one organic phosphite or phosphonite selected from the group consisting of tris(2,4-di-tert-butylphenyl) phosphite, tris(nonylphenyl) phosphite and the formulae

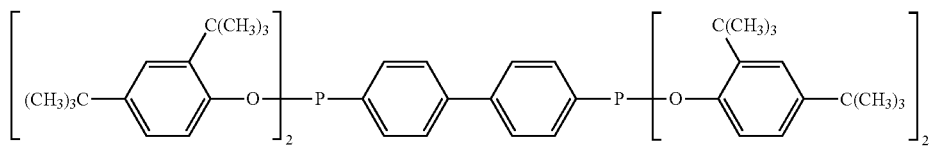

in an amount of from 1 pph to 300 pph by weight based on the weight of the at least one bismuth-containing inorganic pigment.

14. A thermosetting powder coating composition comprising of: (i) the colorant composition of claim 2, (ii) at least one thermally polymerizable thermosetting powder coating resin, and (iii) at least one crosslinker.

15. A thermosetting powder coating composition comprising of: (i) the colorant composition of claim 3, (ii) at least one thermally polymerizable thermosetting powder coating resin, and (iii) at least one crosslinker.

16. The thermosetting powder coating composition of claim 6 wherein the at least one thermally polymerizable thermosetting powder coating resin (ii) is a hydroxyl group-containing polyester.

17. The thermosetting powder coating composition of claim 7 wherein the at least one thermally polymerizable thermosetting powder coating resin (ii) is a carboxyl group-containing polyester or polyacrylate.

18. The thermosetting powder coating composition of claim 8 wherein the mixture of components (ii) and (iii) comprises from 85 to 98 pph by weight of a carboxyl group-containing polyester and from 15 to 2 pph by weight of one or more epoxy and/or beta-hydroxyalkylamide group containing cross-linkers.

\* \* \* \* \*